Patented Apr. 14, 1936

2,037,370

UNITED STATES PATENT OFFICE 2,037,370

FILTERING MEDIUM AND PROCESSES OF PRODUCING THE SAME

Gustavus J. Esselen, Swampscott, and William F. Talbot, Auburndale, Mass., assignors to Union Wadding Company, Pawtucket, R. I., a corporation of Rhode Island No Drawing. Application December 16, 1932, Serial No. 647,618

3 Claims. (Cl. 210—204)

The present invention relates to a filtering medium and processes of producing the same.

In the filtration of liquids, for example milk, speed of filtration is an important consideration in determining the practicability of a filtering medium. A medium otherwise admirably suited for a particular purpose may be rendered impracticable or of limited usefulness because of the length of time required for the passage of the liquid therethrough. In the case, for example, of cotton, the thickness of the filter pad, the small size of the orifices and the effectiveness of sediment removal all contribute to a slow rate of filtration.

The speed of filtration through a fibrous cotton filtering medium may be increased in various ways, many of which have been found to be subject to disadvantages prohibiting their commercial application. Reduction in the thickness of the filter pad, for example, while expediting the process of filtration without serious loss in efficiency of sediment removal, reduces the strength of the filter pad and results in breaking and "washing" or fiber disarrangement. Increase in the size of the orifices in the filter pad obviously results in decreased efficiency of sediment removal. Changing the shape of the orifices from essentially round to a narrow slit shape gives good results in the handling of uniform materials where the particles of the sediment to be removed are uniform in size and symmetrical in shape. But when, as in the filtration of milk, the sediment is neither uniform in size nor symmetrical in shape, the type of filter pad manufactured by combing the fibres essentially into alignment has sacrificed considerable efficiency of sediment retention for the resulting increase in speed of filtration.

It is the object of our invention to provide a method of treating cotton filtering material which will expedite the filtration of liquid, for example milk, therethrough without impairment of the efficiency of sediment removal, and to produce an improved cotton filtering material.

This we accomplish by a chemical treatment of the fibrous cotton with sodium phosphate. The chemicals effective in producing this result are advantageously applied by dissolving the same and treating the fiber with the resulting solution. We have discovered that proper adjustment of the hydrogen ion concentration of such a solution is a very important factor in controlling speed of filtration through the filtering medium thus treated. Good results are obtained using solutions having a pH between 3 and 7. We have further found that best results are obtained with a solution between pH 4 and pH 6. While we are not certain, it appears that the increase in speed of filtration through cotton media treated in accordance with our invention is probably due to a change produced by the treatment in the cotton itself.

We have found that immersion of the cotton in a sodium phosphate solution materially increases the rate of filtration, without interfering with sediment retention. Among examples of such treatment may be mentioned immersion for one-half hour in monobasic sodium phosphate solution of pH 4 or immersion in a solution of dibasic and monobasic sodium phosphates of pH 6.

It will be noted that in the case of these treatments the treating solution is acidic in character. As stated above, best results are obtained using a solution between pH 4 and pH 6, and it is desirable to adjust the pH within these limits by the use of properly buffered solutions.

A typical example of a highly successful treatment is as follows: Washed cotton fiber was immersed for about three minutes in a solution consisting of 8 lbs. of monosodium phosphate and 4 lbs. of disodium phosphate dissolved in 100 gallons of water. The fiber was then passed between heavy squeeze rolls, dried and manufactured into filter pads. A 27% increase in speed of filtration resulted from this treatment.

Having thus described our invention, we claim:

1. In the treatment of cotton to expedite the filtering of liquid therethrough, the step which comprises immersing the cotton in a sodium phosphate solution having a pH between 4 and 6.

2. The treatment of cotton to expedite the filtering of milk therethrough which comprises immersing fibrous cotton in an aqueous solution of monosodium phosphate and disodium phosphate, removing excess solution from the fiber and drying the fiber.

3. A filtering medium consisting of acidic fibrous cotton impregnated with sodium phosphate.

GUSTAVUS J. ESSELEN.
WILLIAM F. TALBOT.